United States Patent [19]

Abe

[11] 4,367,945
[45] Jan. 11, 1983

[54] SLIT EXPOSURE OPTICAL SYSTEM FOR AN ELECTROPHOTOGRAPHIC COPYING APPARATUS

[75] Inventor: Tadashi Abe, Hachioji, Japan

[73] Assignee: Konishiroku Photo Industry Co., Ltd., Tokyo, Japan

[21] Appl. No.: 256,559

[22] Filed: Apr. 22, 1981

[30] Foreign Application Priority Data

Apr. 30, 1980 [JP] Japan .................................. 55-58207

[51] Int. Cl.³ ........................ G03B 27/48; G03B 27/50; G03B 27/70
[52] U.S. Cl. .......................................... 355/51; 355/8; 355/11; 355/57; 355/66
[58] Field of Search .................... 355/8, 11, 51, 57, 65, 355/66

[56] References Cited

FOREIGN PATENT DOCUMENTS 1403177 8/1975 United Kingdom .................. 355/51

Primary Examiner—Richard A. Wintercorn
Attorney, Agent, or Firm—Jordan B. Bierman; Linda Bierman

[57] ABSTRACT

In an electrophotographic copying apparatus of the type using a slit exposure optical system, two carriages carrying a light source and the means for directing an image toward a projection lens are driven relatively to one another through a wire sheave device. The impact energy of said carriages at travel end is absorbed not only by a compressible spring positioned between them, but also by the stretching of the wire which moves them relatively to one another.

2 Claims, 4 Drawing Figures

SLIT EXPOSURE OPTICAL SYSTEM FOR AN ELECTROPHOTOGRAPHIC COPYING APPARATUS

BACKGROUND OF THE INVENTION

1. Field of the Invention

The present invention relates to the slit exposure optical system used for an electrophotographic copying apparatus or the like, and particularly to a structure for absorbing the impact caused by the stopping of the movable mirror.

2. Description of the Prior Art

As is commonly known, there has been a slit exposure optical system wherein the first movable carriage carrying a light source and the first mirror, and the second movable carriage carrying the second and third mirrors that guide the reflected light from the first mirror to the projection lens are used, and both movable carriages are reciprocated with a ratio of traveling speed of 2:1.

In such slit exposure optical system, a sudden stop of both movable carriages ar their end of travel is needed, and when these movable carriages hit the frame of the apparatus body, the impactive force is transferred to the apparatus body, which is not desirable. In the past, therefore, the stopper cushioned by the spring and the like has been located at the travel end position on the frame of the apparatus body. On such structure, however, it has been impossible to completely eliminate the crashing sound because both movable carriages hit the stopper at considerable high speed and the frame of the apparatus body has been subjected to a considerably impactive force; therefore, not only the frame of the apparatus body vibrates, but also the shock absorbing function of said stopper sometimes becomes ineffective in case of the change in the reciprocating distance of a movable carriage made for the purpose of improvement in the efficiency of continuous copying.

SUMMARY OF THE INVENTION

The object of the present invention is to obtain a slit exposure optical system wherein the structure is relatively simple and the impactive force caused by the stop of a movable carriage is not only completely absorbed but also is capable of absorbing the shock effectively even if the reciprocating distance of a movable carriage is changed for the better efficiency for continuous copying.

According to the present invention, this object is attained by positioning between the first movable carriage and the second movable carriage an elastic body that is compressed between both movable carriages at the end of the advancing traveling step of both movable carriages, and by absorbing the impactive force caused by the stop of both movable carriages with an elongation of the wire of a wire sheave device.

DETAILED DESCRIPTION OF THE PREFERRED EMBODIMENTS

The illustrated electrophotographic copying apparatus is the one with a variable magnification and it is possible to obtain 3 kinds of copies of the document placed on the document glass plate including reduced or full size copies.

Figure 1:
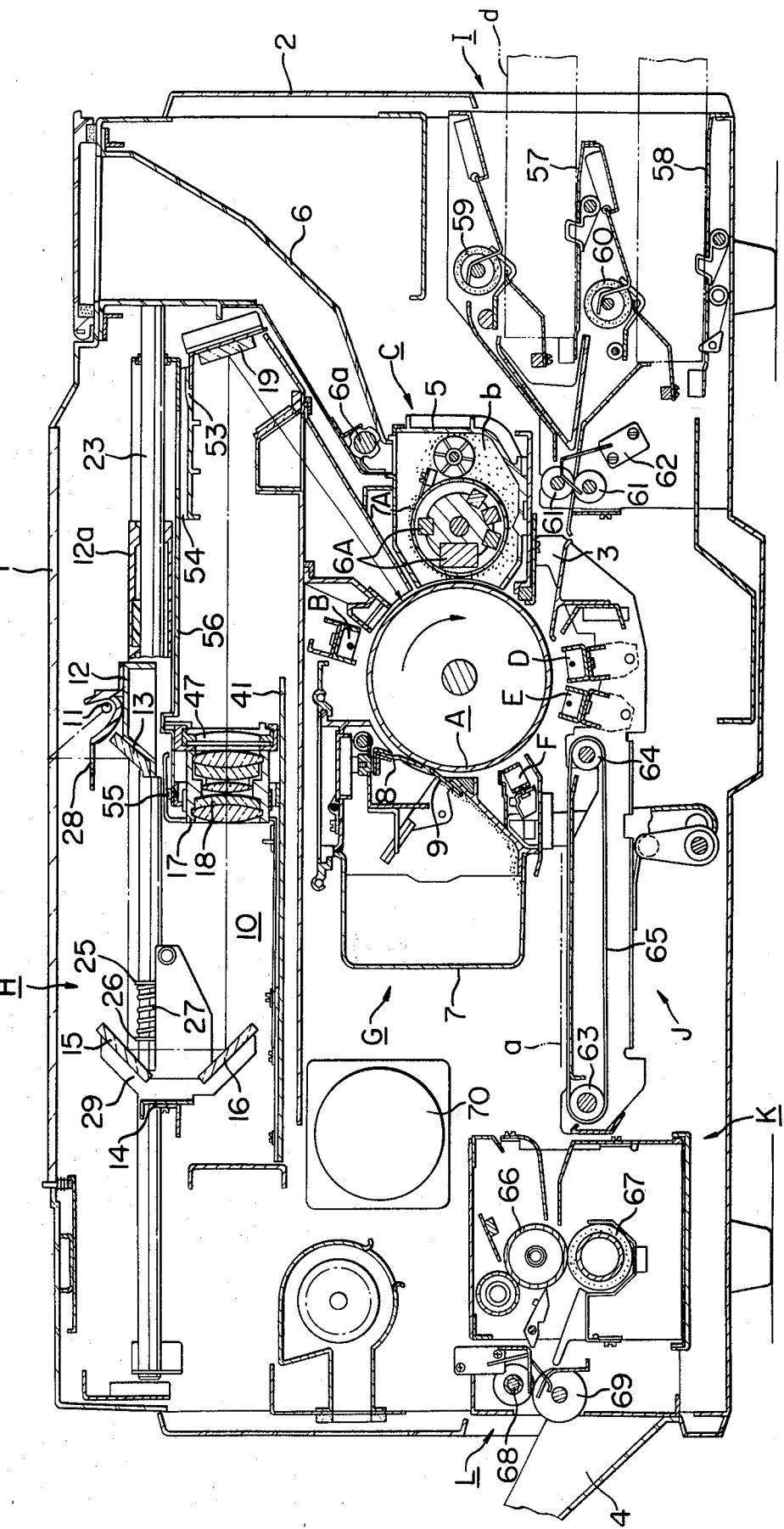
FIG. 1 is a sectional view of an electrophotographic copying machine provided with the present invention.

FIG. 1 is a complete sectional view of a electrophotographic copying apparatus wherein the present invention is embodied, in which the photoreceptor drum A rotated in the direction of arrow is mounted at the center of the inside of the apparatus body housing 2. Around the photoreceptor drum A, the process units adjoining each other in the direction of rotation such as the charger B, the developing device C, the transferring electrode D, the separation electrode E, the charge eliminating electrode F and the cleaning device G are arranged. Above the photoreceptor drum A, there is positioned a slit exposure optical system H that transforms an image of the document placed on the document glass plate 1 onto the surface of the photoreceptor drum A between the charger B and the developing device C.

At the lower part at the right side of said apparatus body housing 2, there is arranged a paper feeding device I that feeds out recording paper one sheet at a time to the paper feeding passage 3 positioned just beyond the developing device C. Beneath the cleaning device G, there is arranged a paper transporting device J that transports the recording paper onto which the toner image is transferred from the photoreceptor drum A. After the toner image on the recording paper is carried to the left side by the paper transporting device J, it is heat-fixed by the fixing device K. The recording paper then is ejected onto the copy ejecting tray 4 by the action of the paper ejecting roller device L.

The details of each unit stated above will be described next. The developing device C is equipped with the developer container 5 whose surface facing the photoreceptor drum A is open, and in this developer container 5, a two-component developer b composed of magnetic carrier and electrostatic toner or one component developer is held. In said developer container 5, there is arranged a rotary sleeve 7A surrounding plural stationary permanent magnets 6A, whereby the ear of the developer is formed around the external surface of the rotary sleeve 7A. Attached to the developer container 5, there is a toner replenishing hopper 6 having a replenishing roller 6a by means of which the toner is replenished and thus the concentration of toner is kept constant.

The cleaning device G is equipped with a container 7 that accepts the toner collected from the peripheral surface of the photoreceptor drum A, and in said container 7, there is arranged a cleaning blade 8 whose edge is contacted with pressure against the peripheral surface of the photoreceptor drum A, and thereby the toner is scraped off from said peripheral surface. The cleaning blade 8, as stated later, is slightly reciprocated in the direction of the width of the photoreceptor drum A and thus an erroneous cleaning caused by partial damage and a local damage on the photoreceptor drum A are prevented. At the lower part of said blade 8, there is positioned a thin guide plate 9 that guides the toner scraped off by said blade 8 to the bottom of the container 7. This guide plate 9 is given periodically an impactive force by a cam (not shown) and consequent vibration of the guide plate 9 shakes off the toner accumulating on the surface thereof.

It is to be understood that the various elements of the electrophotographic copying apparatus hereinbefore described are illustrative and may be changed in various ways known to the art for use with the slit exposure apparatus to be described hereinafter.

Figure 2:
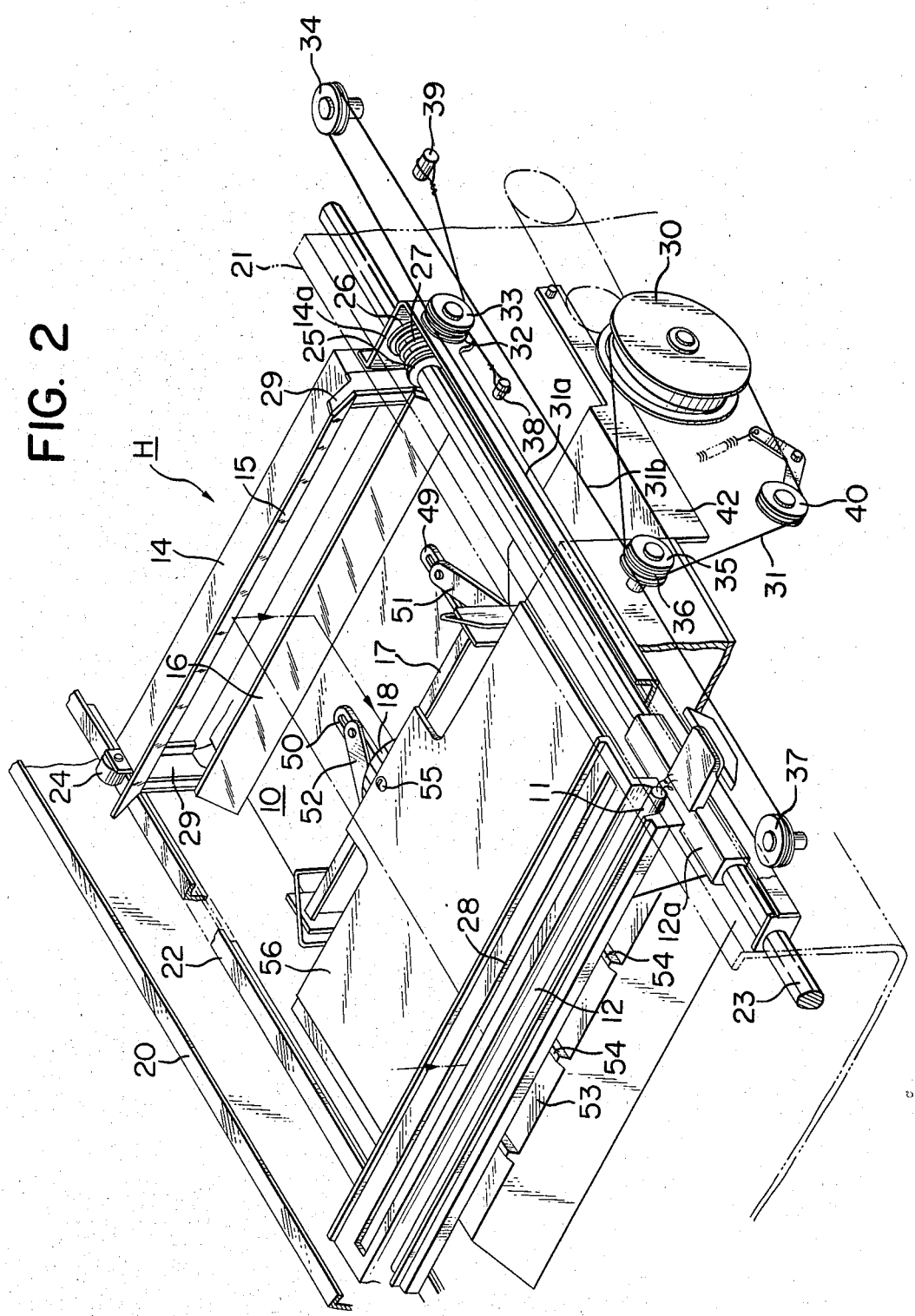
FIG. 2 is a perspective view of the slit exposure optical system of the said copying apparatus.
Figure 3:
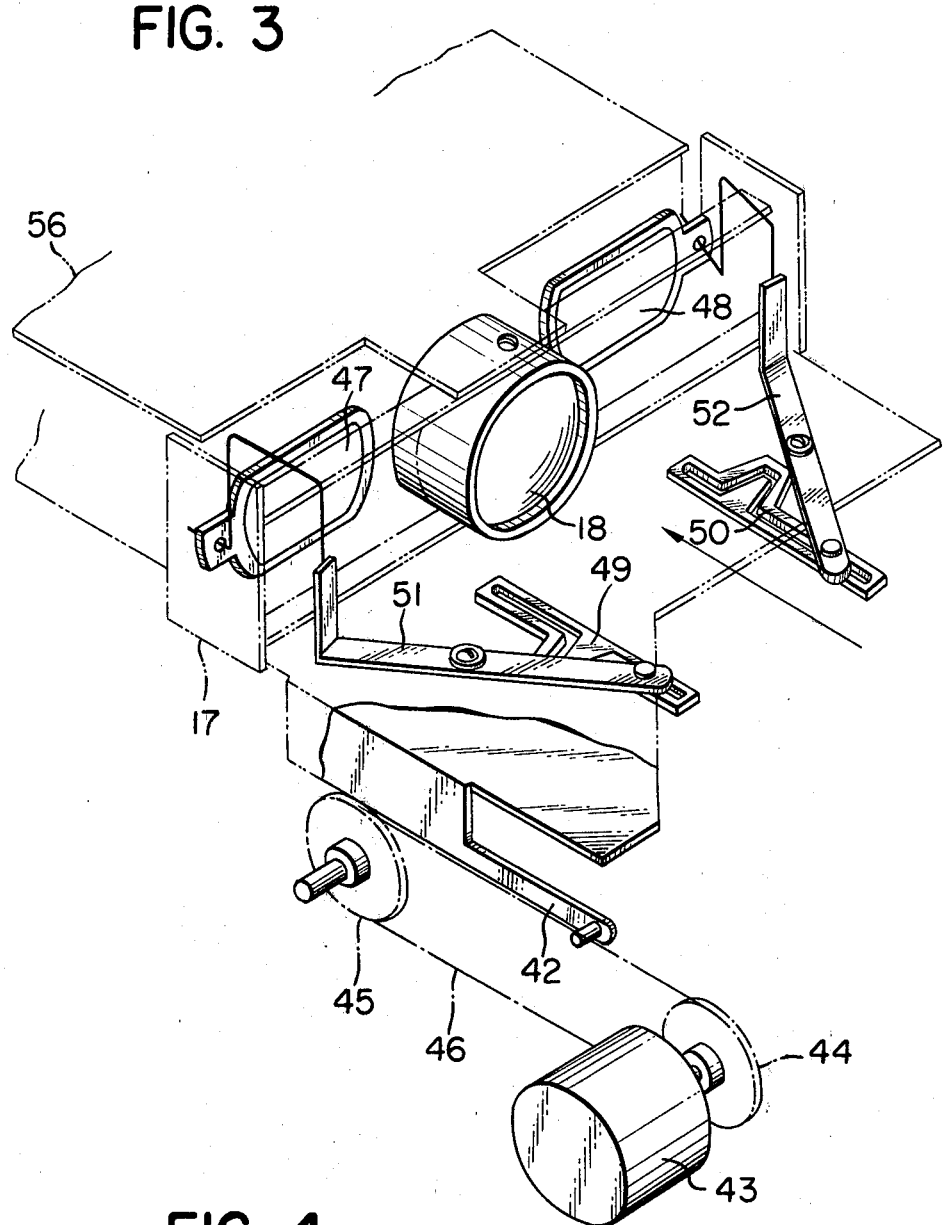
FIG. 3 is a perspective view in the neighborhood of a lens board.

The slit exposure optical system H of the present invention whose details are shown in FIG. 2 and FIG. 3 is assembled into the camera obscura 10 that shields the external light for the photoreceptor drum A. Namely, the slit exposure optical system H consists of the first mirror 13 (showed FIG. 1) fixed on the first movable carriage 12 on which the light source 11 is mounted. A second mirror 15 and the third mirror 16 each are mounted on a second movable carriage 14 having a certain relationship, as hereinafter explained, to the first movable carriage 12. A projection lens 18 is arranged on the lens board 17 whose position can be changed according to the copying purposes. It teceives reflected light from the third mirror 16. A fourth mirror 19 is fixed at one end of said camera obscura 10 and projects an image of the ray of incident light from the projection lens 18 onto the peripheral surface of the photoreceptor drum A:

The first movable carriage 12 and the second movable carriage 14 are mounted on and between the guide rail 22 and the guide rod 23 arranged on the internal surface of apparatus frames 20 and 21 opposing each other in the direction of the width of the photoreceptor drum A (FIG. 2). At one end of the first movable carriage 12 and of the second movable carriage 14, there are provided rollers 24 that roll along the guide rail, and the other ends 12a and 14a are slidably mounted on the guide rod 23. On said guide rod 23, a compressible spring 27 is positioned between said first movable carriage 12 and the second movable carriage 14, and sandwiched between a pair of washers 25 and 26 so that it can move freely. This compressible spring 27, as is later explained, is compressed between the first movable carriage 12 and the second movable carriage 14 at the last point of the advancing traveling step of the slit exposure optical system H, and thereby absorbs the impact caused by the sudden stop of said movable carriages 12, 14. Washers 25 and 26 are recommended to be made of hard rubber or resin in order to reduce the clash noise against ends 12a and 14a. On said first movable carriage 12, there is formed a slit 28 that guides the reflected light from the document to the first mirror 13, while the second mirror 15 that receives the reflected light from the first mirror 13 and the third mirror 16 that guides the reflected light from the second mirror 15 to the projection lens 18 are mounted on the Y-shaped supporting members 29 fixed at both ends of the second movable carriage 14.

The movement of said first movable carriage 12 and said second movable carriage 14, as shown in FIG. 2, are controlled by the driving drum 30 that is driven by a driving device to be described later. Between the driving drum 30 and the first and second movable carriages 12, 14, a wire sheave device consisting of the wire 31 and plural sheaves 32–37 is provided. A section 31a of the wire 31 is fixed to the stay 38 mounted on the apparatus frame 21 and then is attached to the first movable carriage 12 after passing about on the movable sheave 32 on the second movable carriage 14. The section 31b is attached to the stay 39 on the apparatus frame 21, and after passing over the movable sheave 33 coaxial with the movable sheave 32, the stationary sheaves 34, 35 mounted on the machine frame 21 and the tension roller 40, is wound round the driving drum 30 and then is fixed to the first movable carriage 12 through the stationary sheave 36 coaxial with the stationary sheave 35, and the stationary sheave 37 opposite to the stationary sheave 34. With such structure, therefore, the second movable carriage 14 is moved at half the speed of the first movable carriage 12 by the constant speed rotation of the driving drum 30, and therefore a optical system wherein the optical length from the document to the projection lens 18 is always constant is obtained and the surface of the document is scanned by the travel of the movable carriages 12 and 14.

The lens board 17 is located on the supporting plate 41 (shown in FIG. 1) horizontally positioned in said camera obscura 10. The lens board 17 can be moved along the supporting plate 41 in the same direction as the movable carriage 12, as is shown in FIG. 3, and has a coupling piece 42 extended from one end. This coupling piece 42 is connected to the chain 46 passing over a pair of sprockets 44 and 45 driven by the auxiliary motor 43. The auxiliary motor 43 is started by the instructions of a manual operating button (not shown) from which the designation of the magnification is made, and it is stopped by the microswitch (not shown) that detects the position of the lens board 17. Lens board 17 supports two attachment lenses 47 and 48 which are selectively positioned within the optical path of the projection lens 18 in accordance with the designated magnification, namely the position of the lens board 17. The attachment lenses 47 and 48 that remove the distortion of the image caused by a certain copy magnification are slidably held in the lens board 17 by the middle portion thereof, and each end thereof is operated by the cam follower 51 and 52 linked to cam means 49 and 50 respectively on the supporting plate 41.

In FIG. 1, FIG. 2 and FIG. 3, there is arranged a light shielding wall 53 that is substantially horizontal in said camera obscura 10 and prevents the direct indicence from the document glass plate to the fourth mirror 19 by covering the upper portion of the incident optical path of the fourth mirror. On the top surface of the light shielding wall 53, plural parallel protruding strips 54 are arranged in the external part in the direction of the movement of said lens board 17. On said lens board 17, on the other hand, the light shielding plate 56 which is approximately horizontal is fixed with a screw 55 in a cantilever mode and the free end portion of this light shielding plate 56 rests on said protruded strips. Therefore, the optical path from the projection lens 18 to the photoreceptor drum A via the fourth mirror 19 is perfectly shielded from the external light and the lens board 17 can smoothly be moved in case the lens board 17 is moved for the designation of the magnification because the friction resistance between the protruded strips 54 and the light shielding plate 56 is small.

Returning to FIG. 1, the paper feeding device I is equipped with one set of paper feeding trays 57 and 58 that accept plural magazines d and e containing different sized recording papers respectively. On these paper feeding trays 57 and 58, paper feeding rollers 59 and 60 that feed out the recording paper in the magazines d and e to the paper feeding path 3 one sheet at a time are provided. In said paper feeding path 3, there are positioned a pair of paper registrating rollers 61 that feed the recording paper fed out from the paper feeding trays 57 and 58 to the photoreceptor drum A, and at the position of such paper registrating rollers 61, there is positioned a microswitch 62 that can detect the leading edge and the trailing edge of the recording paper. Signals detected by this microswitch 62 are fed to the microcomputer and are utilized as signals of instruction for reciprocating movement of said slit exposure optical system H. Namely, the rotation and the stop thereof for the driving drum 30 are controlled by the instruction of this microswitch 62, and the distance of the reciprocating movement of the movable carriages 12 and 14 is changed according to the size of the recording paper a and thus the useless time in continuous copying can be removed.

The paper transporting device J is equipped with plural transporting belts 65 passing over opposing driving roller 63 and driven roller 64 and the recording paper is transported to the fixing device K by these transporting belts 65. Said fixing device K has a heat roller 66 that is rotated and a pressure roller 67 that is in pressure contact with and is driven by the heat roller 66, the toner image on the recording paper is melted and fixed by the heating of the heat roller 66. On the other hand, the paper ejecting roller device L is equipped with a paper ejecting roller 68 that is rotated and a driven roller 69 that is in rotational contact with the paper ejecting roller 68. Owing to the rotation of such rollers 68 and 69, the recording paper with toner images fixed thereon is ejected onto the paper ejecting tray 4. Furthermore, in FIG. 1, the numeral a driving motor 70 is indicated.

Figure 4:
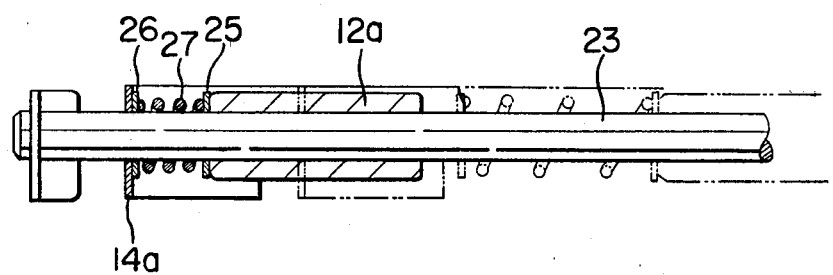
FIG. 4 is an explanatory view of a slit exposure optical system at the last point of advancing traveling thereof.

The slit optical exposure system H of the invention is constituted as described above, therefore, as shown in FIG. 4, at the last point of the advancing travelling step, the compressure spring 27 is compressed by and between the end 12a of the first movable carriage and the end 14a of the second movable carriage 14. In this case, the pressurizing energy of spring 27 will work so as to gradually reduce the relative speed of first movable carriage 12 which is approaching second movable carriage 14, and the relative speed between both first movable carriage 12 and the second carriage 14 will be equalized with each other. Simultaneously therewith, the section 31a of wire 31 connected between stay 38 of apparatus frame 21 and first movable carriage 12 is expanded by the kinetic energy of both movable carriages 12 and 14, and said energy is transformed into elastic strain energy. In this case, the tension of section 31a of wire 31 applied to first movable carriage 12 and the reaction force of compressible spring 27 are opposed to each other in the direction thereof; accordingly there is no danger that the elastic strain force of both of the said wire 31 and spring 27 might be released rapidly, and also no impulsive force might be applied onto apparatus frame 21.

In the examples described above, compressure spring 27 is given as an example, however, it is to be understood that the invention is not limited thereto, but the other elastic substance can be used therein.

What is claimed is:

1. A slit exposure optical system for an electrophotographic copying apparatus comprising a first movable carriage equipped with a light source and a first mirror, a projection lens, a second movable carriage equipped with a second mirror guiding light reflected from said first mirror to said projection lens, a wire sheave device to reciprocate said first and second movable carriages toward and away from one another, compressible elastic means between said carriages to absorb the impact energy between the two at their final step of movement toward one another, said wire sheave device including a drum, a wire actuated thereby to drive said second movable carriage at a speed over that of said first movable carriage, and means interconnecting said wire to said carriages to effect elongation of the same and thereby absorb the impactive force caused by their stoppage.

2. A slit exposure optical system according to claim 1 in which said first and second carriages are slidably mounted on a common guide rod, and said compressible elastic means is a compressible spring on said guide rod between said two carriages.

* * * * *